US009428053B2

United States Patent
Takagi et al.

(10) Patent No.: US 9,428,053 B2
(45) Date of Patent: Aug. 30, 2016

(54) VEHICLE CONTROL DEVICE (75) Inventors: Masashi Takagi, Nagoya (JP); Hiroshi Shimada, Mishima (JP); Michihito Shimada, Toyota (JP); Motonari Obayashi, Susono (JP); Shinya Kodama, Toyota (JP); Akihiro Kida, Toyota (JP); Akito Oonishi, Nagoya (JP); Takamasa Kitamura, Nagoya (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 17 days.

(21) Appl. No.: 14/123,802

(22) PCT Filed: Jun. 16, 2011

(86) PCT No.: PCT/JP2011/063834
§ 371 (c)(1),
(2), (4) Date: Dec. 4, 2013

(87) PCT Pub. No.: WO2012/172673
PCT Pub. Date: Dec. 20, 2012

(65) Prior Publication Data
US 2014/0095045 A1 Apr. 3, 2014

(51) Int. Cl.
*B60K 31/00* (2006.01)
*B60W 10/06* (2006.01)
(Continued)

(52) U.S. Cl.
CPC ............. *B60K 31/00* (2013.01); *B60W 10/06* (2013.01); *B60W 10/184* (2013.01); *B60W 30/188* (2013.01); *B60W 30/18109* (2013.01); *B60W 50/10* (2013.01); *B60W 2710/0666* (2013.01);
(Continued)

(58) Field of Classification Search
CPC .......... B60W 10/06; B60W 2540/10; B60W 2540/12; B60W 30/18; B60W 2510/0638; B60W 2710/0644; B60W 2540/16; B60W 2710/0605; B60W 2510/105; B60W 2510/18; B60W 2520/125; B60W 2520/14; B60W 2550/13; B60W 2710/0622; B60W 2710/065; B60W 2710/0661
USPC ............... 701/50, 51, 53, 54, 110, 113, 115; 477/121, 132, 143, 65, 320
See application file for complete search history.

(56) References Cited

U.S. PATENT DOCUMENTS 5,007,516 A * 4/1991 Miyazaki ............... B60K 26/00
180/278
6,125,315 A * 9/2000 Kon et al. ........................ 701/54
(Continued)

FOREIGN PATENT DOCUMENTS

JP 2005-291030 A 10/2005
JP 2006-233870 A 9/2006
(Continued)

*Primary Examiner* — Truc M Do
(74) *Attorney, Agent, or Firm* — Sughrue Mion, PLLC (57) ABSTRACT

An electronic control unit performs a reduction control for reducing vehicle drive force when the accelerator and the brake are operated simultaneously. The electronic control unit also varies the amount of decrease in the vehicle drive force during the reduction control and conditions under which the reduction control is implemented depending on the order of the accelerator operation and brake operation resulting in the above-noted simultaneous operation. For example, the amount of decrease in the vehicle drive force is less when the brake is operated first in comparison with when the accelerator is operated first. Thus, it is possible to operate the vehicle drive force in accordance with the intention of the driver.

14 Claims, 4 Drawing Sheets

(51) Int. Cl.
*B60W 10/184* (2012.01)
*B60W 30/18* (2012.01)
*B60W 30/188* (2012.01)
*B60W 50/10* (2012.01)

(52) U.S. Cl.
CPC .... *B60W 2710/182* (2013.01); *B60W 2720/30* (2013.01)

(56) References Cited

U.S. PATENT DOCUMENTS

| | | | |
|---|---|---|---|
| 6,338,697 B1* | 1/2002 | Baudoin | F02D 11/10 |
| | | | 477/203 |
| 6,480,779 B2* | 11/2002 | Mardberg | 701/70 |
| 7,771,312 B2* | 8/2010 | Sigmund | 477/107 |
| 8,473,184 B2* | 6/2013 | Yoon | F02D 41/0005 |
| | | | 123/321 |
| 8,554,419 B2* | 10/2013 | Crombez et al. | 701/48 |
| 8,798,886 B2* | 8/2014 | Nodera et al. | 701/70 |
| 8,808,143 B2* | 8/2014 | Tomiie | B60W 50/087 |
| | | | 477/203 |
| 2004/0127333 A1* | 7/2004 | McCall | 477/206 |
| 2008/0228369 A1* | 9/2008 | Stroh et al. | 701/84 |
| 2010/0197458 A1* | 8/2010 | Turski et al. | 477/109 |
| 2010/0217489 A1* | 8/2010 | Turski et al. | 701/48 |
| 2010/0312440 A1* | 12/2010 | Ellis et al. | 701/54 |
| 2011/0178680 A1* | 7/2011 | Kato et al. | 701/41 |
| 2011/0213516 A1* | 9/2011 | Choi et al. | 701/22 |
| 2012/0065851 A1* | 3/2012 | Ellis et al. | 701/54 |
| 2013/0123066 A1* | 5/2013 | Tomiie et al. | 477/185 |

FOREIGN PATENT DOCUMENTS

| | | |
|---|---|---|
| JP | 2008-063953 A | 3/2008 |
| JP | 2010-038051 A | 2/2010 |
| JP | 2010-101264 A | 5/2010 |

\* cited by examiner

VEHICLE CONTROL DEVICE

CROSS REFERENCE TO RELATED APPLICATIONS

This application is a National Stage of International Application No. PCT/JP2011/063834 filed Jun. 16, 2011, the contents of all of which are incorporated herein by reference in their entirety.

TECHNICAL FIELD

The present invention relates to a vehicle control device that performs reduction control of a vehicle drive force when an accelerator operation and a brake operation are simultaneously performed.

BACKGROUND ART

Conventionally, as disclosed for instance in Patent Document 1, a vehicle control device has been known that outputs a throttle-off signal when an accelerator operation and a brake operation are simultaneously performed, and reduces the output of an engine, which is a drive source of a vehicle, to reduce the vehicle drive force, thereby ensuring vehicle stability and protecting the engine and the drive system.

PRIOR ART DOCUMENT

Patent Document

Patent Document 1: Japanese Laid-Open Patent Publication No. 2010-038051

SUMMARY OF THE INVENTION

Problems that the Invention is to Solve

Some drivers perform an accelerator operation with the right foot and perform a brake operation with the left foot. Such drivers sometimes perform a hill start by depressing an accelerator pedal with the right foot in a state of depressing the brake pedal with the left foot. For reacceleration after reduction in vehicle speed, such drivers sometimes depress the accelerator pedal while gradually releasing the depressed brake pedal. In such cases, the accelerator operation overlaps with the brake operation in a certain time period.

An operation technique called heel-and-toe has been known as a driving technique for manual transmission vehicles. A heel-and-toe operation is performed according to the following procedures. First, the brake pedal is depressed with the toe of the right foot, and then the clutch pedal is depressed with the left foot. Subsequently, while the brake pedal is kept depressed so as not to reduce the brake pedal depressing force, the right foot is turned a little and the accelerator pedal is pressed with the heel. A shift down operation is performed with a shift lever, and then the depression of the clutch pedal with the left foot is released to engage the clutch. In such a heel-and-toe operation, the accelerator operation overlaps with the brake operation in a certain time period.

In such a case, the driver performs the accelerator operation for the sake of increasing the vehicle drive force. If the vehicle drive force is reduced in response to simultaneous operations on the accelerator and the brake also in such a case, the vehicle drive force cannot be increased according to the intention of the driver. Accordingly, if reduction control of the vehicle drive force is always performed in response to simultaneous operations on the accelerator and the brake in a uniform manner, the operation of the vehicle drive force according to the intention of the driver cannot be performed, which may degrade drivability.

The present invention has been made in view of these problems, and has an object for solving the problems to provide a vehicle control device that can operate the vehicle drive force according to the intention of the driver even in the case of executing reduction control of the vehicle drive force in response to simultaneous operations on the accelerator and the brake to thereby suppress degradation in drivability.

Means for Solving the Problems

To achieve the foregoing objective, a vehicle control device according to the present invention performs reduction control for reducing a vehicle drive force when an accelerator operation and a brake operation are simultaneously performed. Control manner of the reduction control varies between a case where the accelerator operation is performed first and then the brake operation is performed and a case where the brake operation is performed first and then the accelerator operation is performed.

In cases of simultaneous operations on the accelerator and the brake, the intentions of drivers may be different. The difference in intentions of the drivers resulting in simultaneous operations on the accelerator and the brake can be discriminated to a certain extent on the basis of the order of operations on the accelerator and the brake.

In this respect, the control manner of the reduction control of vehicle drive forces in response to simultaneous operations on the accelerator and the brake is different between the case where the accelerator operation is performed first and the case where the brake operation is performed first in the present invention. Thus, according to the present invention, even if the reduction control of the vehicle drive force is performed in response to simultaneous operations on the accelerator and the brake, the vehicle drive force can be operated according to the intention of the driver to thereby suppress degradation in drivability.

Specifically, an amount of reduction in the vehicle drive force of the reduction control may vary between the case where the accelerator operation is performed first and then the brake operation is performed and the case where the brake operation is performed first and then the accelerator operation is performed. In this case, if the amount of reduction of the vehicle drive force is smaller in the case where the brake operation is performed first than in the case where the accelerator operation is performed first, the vehicle drive force can be operated according to the intention of the driver.

Further, a condition of executing the reduction control may vary between the case where the accelerator operation is performed first and then the brake operation is performed and the case where the brake operation is performed first and then the accelerator operation is performed. In this case, the execution condition may be varied by varying a determination threshold of a braking force for determining whether the reduction control is required to be executed, or by varying a determination threshold of the simultaneous operation duration for determining whether the reduction control is required to be executed. If the determination threshold of the braking force is higher or the determination threshold of the duration is higher in the case where the brake operation is performed first than in the case where the accelerator operation is performed first, the vehicle drive force can be operated according to the intention of the driver.

A delay time until the reduction control is started may vary between the case where the accelerator operation is performed first and then the brake operation is performed and the case where the brake operation is performed first and then the accelerator operation is performed. In these situations, if the delay time is longer in the case where the brake operation is performed first than in the case where the accelerator operation is performed first, the possibility of executing reduction control of the vehicle drive force in response to simultaneous operations on the accelerator and the brake decreases in the case of operations first on the brake and then on the accelerator. Accordingly, the vehicle drive force can be operated according to the intention of the driver.

A length of the delay time preferably varies according to a vehicle speed or an amount of accelerator operation. Specifically, it is preferable to configure such that the higher the vehicle speed, the longer the length of the delay time becomes, or that the larger the amount of accelerator operation, the longer becomes the length of the delay time in the case where the brake operation is performed first. The delay time is preferably set only in a case where the brake operation is performed first and a vehicle speed is high or in a case where the brake operation is performed first and a gear ratio of a speed reducer is high.

In a case where the brake operation is performed first and a vehicle speed is high, or in a case where the brake operation is performed first and a gear ratio of a transmission is high, reduction in the vehicle drive force may be prohibited. In these situations, the braking force is kept sufficiently higher than the driving force. Accordingly, the braking force required to reduce the vehicle speed can be ensured without any reduction in vehicle drive force.

MODES FOR CARRYING OUT THE INVENTION

First Embodiment

Figure 1:
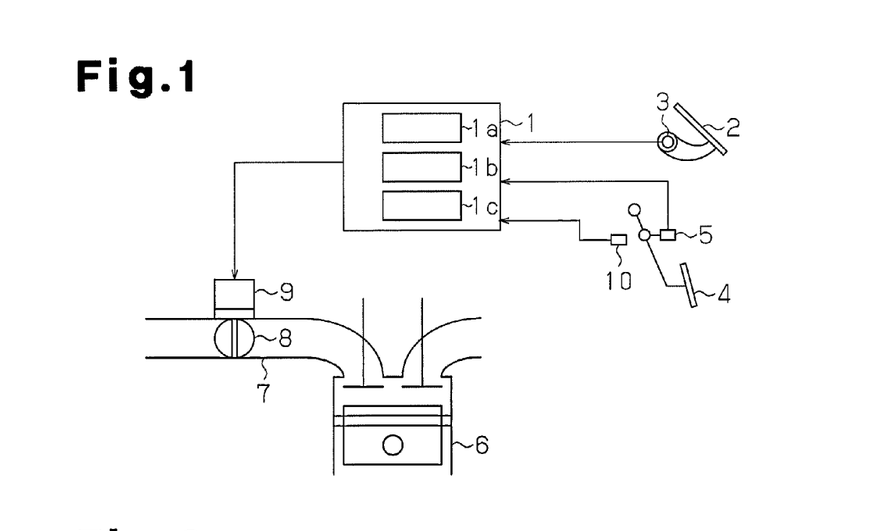
FIG. 1 is a simplified diagram schematically showing an overall configuration of a first embodiment of the present invention.
Figure 2:
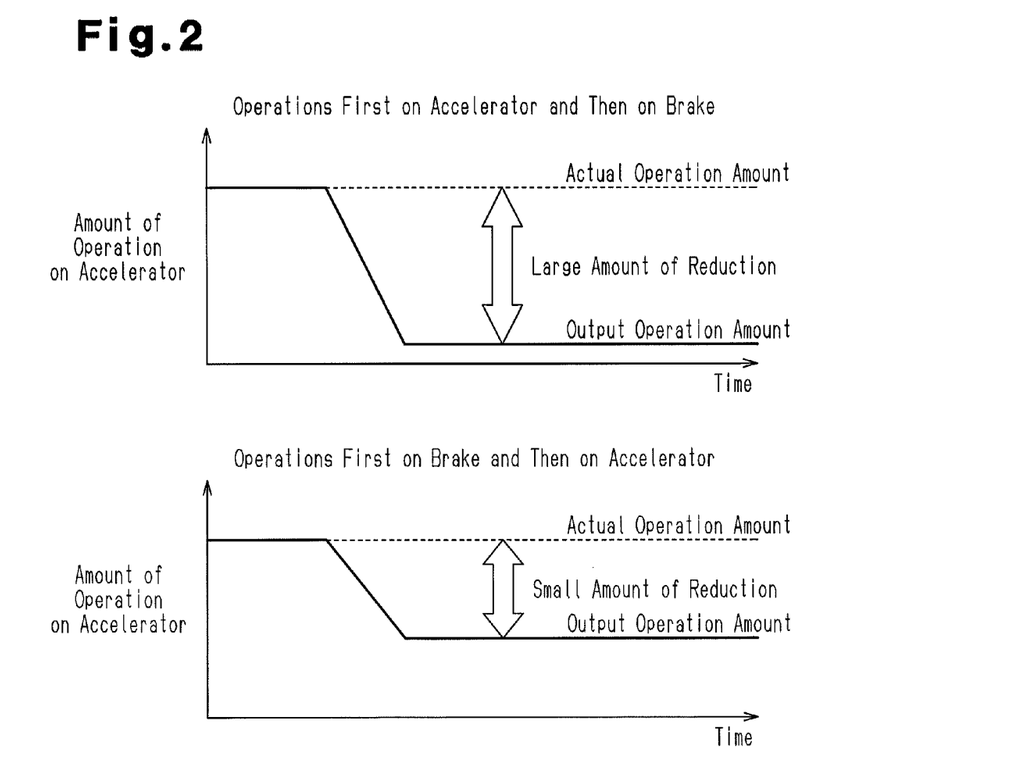
FIG. 2 provides graphs showing the manner of setting the output operation amount in the case where operations are made first on the accelerator and then on the brake and in the case where operations are made first on the brake and then on the accelerator.
Figure 3:
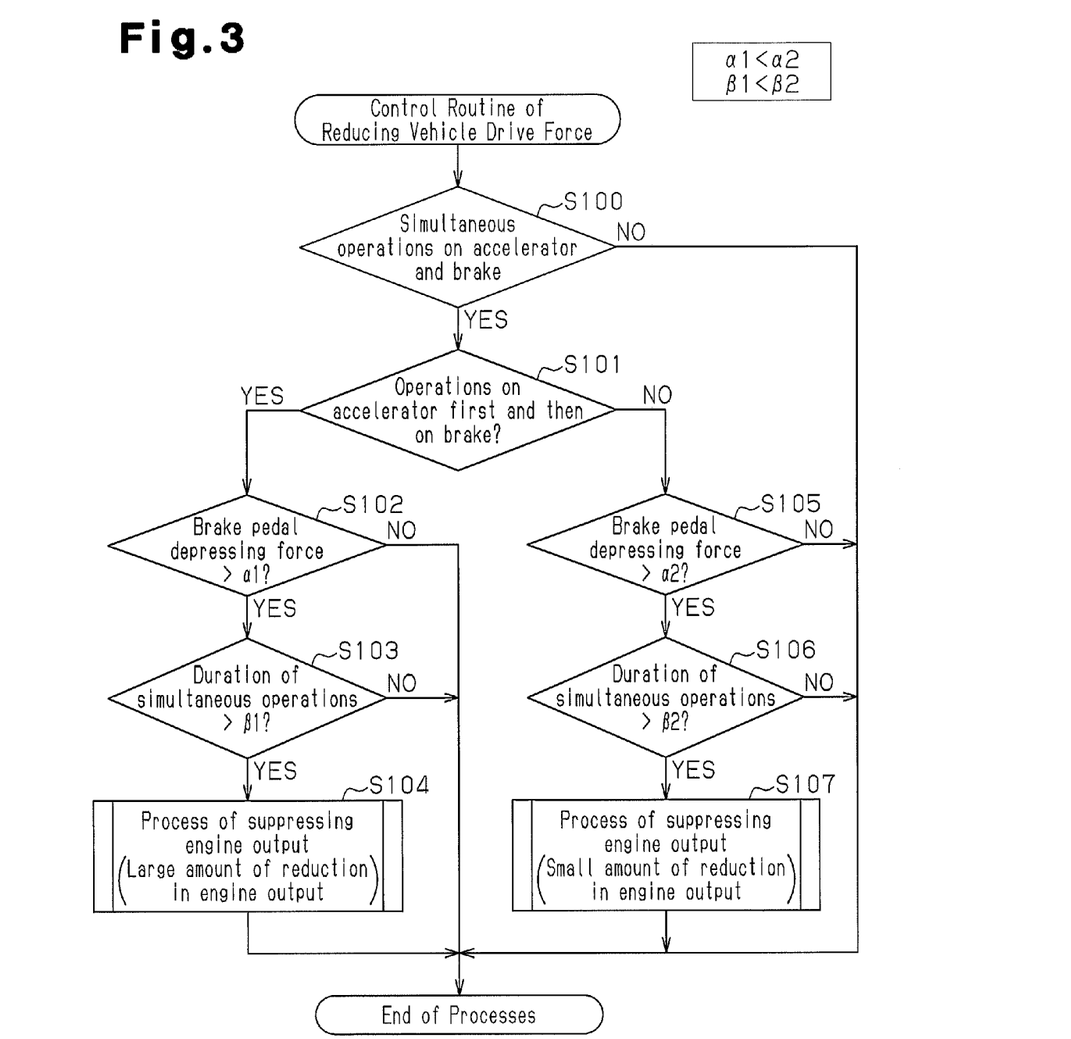
FIG. 3 is a flowchart showing a procedure of a control routine for reducing the vehicle drive force, which is applied to this embodiment.

A vehicle control device according to a first embodiment of the present invention will hereinafter be described in detail with reference to FIGS. 1 to 3. The control device of this embodiment is applied to a vehicle on which an engine is mounted as a drive source.

First, referring to FIG. 1, the configuration of this embodiment will be described. As shown in FIG. 1, the vehicle control device of this embodiment is configured mainly of an electronic control unit 1 mounted on a vehicle. The electronic control unit 1 includes a central processing unit (CPU) 1$a$ that performs various computational processes pertaining to vehicle control, a read-only memory (ROM) 1$b$ storing programs and data for control, and a random access memory (RAM) 1$c$ temporarily storing computational results of the CPU 1$a$ and detection results of sensors.

Such an electronic control unit 1 is connected with sensors and switches provided at respective sites on the vehicle, for instance, an accelerator pedal sensor 3 that detects the amount of operation on an accelerator pedal (accelerator operation member) 2, a stop lamp switch 5 for turning on stop lamps in response to depression of the brake pedal (brake operation member) 4, and a brake pedal depressing force sensor 10 that detects a pedal depressing force on the brake pedal 4 (brake pedal depressing force). The electronic control unit 1 is further connected with actuators provided at respective sites on the vehicle, for instance, a throttle motor 9 that drives a throttle valve 8 provided on an air intake path 7 of an engine 6.

In such a vehicle, the electronic control unit 1 learns driving state of the vehicle from detection results of the sensors and the switches. The electronic control unit 1 then outputs instruction signals to the respective actuators in accordance with the learned driving state of the vehicle, thereby controlling the vehicle.

The electronic control unit 1 performs reduction control that reduces the vehicle drive force, as a part of vehicle control, in the case where the accelerator pedal 2 and the brake pedal 4 are simultaneously depressed, i.e., the case of simultaneous operations on the accelerator and the brake. In the reduction control, the electronic control unit 1 detects an operation on the accelerator pedal 2, i.e., an accelerator operation, from the detection signal of the accelerator pedal sensor 3, and detects an operation on the brake pedal 4, i.e., a brake operation, in response to turning-on of the stop lamp switch 5.

Upon detecting that simultaneous operations on the accelerator and the brake are performed, the electronic control unit 1 overwrites the value of the amount of operation on the accelerator pedal 2 detected by the accelerator pedal sensor 3 (actual operation amount) with a value lower than the actual value. The electronic control unit 1 then controls the throttle motor 9 according to the overwritten value (the output operation amount) to reduce the opening of the throttle valve 8 and reduce the output of the engine 6, thereby reducing the vehicle drive force.

The simultaneous operations on the accelerator and the brake include the case where the accelerator operation is performed first and then the brake operation is performed, and the case where the brake operation is performed first and then the accelerator operation is performed. In the case where, after the brake operation, the accelerator operation is performed resulting in simultaneous operations on the accelerator and the brake, it can be considered that the driver performs the accelerator operation with an intention of increasing the vehicle drive force. Accordingly, if the vehicle drive force is reduced in this case, as in the case where the brake operation is performed after the accelerator operation, the vehicle drive force cannot be in accordance with the intention of the driver, which degrades the drivability.

Thus, in this embodiment, the control manner of the reduction control of the vehicle drive force according to simultaneous operations on the accelerator and the brake vary between the case where the accelerator operation is performed first and then the brake operation is performed and the case where the brake operation is performed first and then the accelerator operation is performed. More specifically, as shown in FIG. 2, the amount of reduction of the output operation amount from the actual operation amount is smaller in the case where the brake operation is performed first and then the accelerator operation is performed resulting in simultaneous operations on the accelerator and the brake, than in the case where the accelerator operation is performed first and then the brake operation is performed resulting in simultaneous operations on the accelerator and the brake. Thereby, the amount of reduction of the engine output in the reduction control of the vehicle drive force on simultaneous operations and, in turn, the amount of reduction of the vehicle drive force are smaller in the case where the brake operation is performed first than in the case where the accelerator operation is performed first.

In this embodiment, conditions of executing the reduction control of the vehicle drive force vary between the case where the brake operation is performed first and the case where the accelerator operation is performed first. More specifically, a determination threshold of the braking force for determining whether the reduction control is required to be executed varies, and a determination threshold of duration of simultaneous operations for determining whether the reduction control is required to be executed varies. The determination threshold of the braking force and the determination threshold of the duration are set higher in the case where the brake operation is performed first than in the case where the accelerator operation is performed first.

Next, detailed processes of the electronic control unit 1 pertaining to the reduction control of the vehicle drive force, which is adopted in this embodiment, will be described with reference to FIG. 3. The control routine for reducing the vehicle drive force shown in this diagram is repeatedly performed by the electronic control unit 1 at prescribed control cycles.

After this routine is started, in step S100 it is first determined whether simultaneous operations on the accelerator and the brake are being performed. If simultaneous operations on the accelerator and the brake are not being performed (S100: NO), the processes in the routine at this time are ended.

In contrast, if simultaneous operations are being performed on the accelerator and the brake (S100: YES), the processing proceeds to step S101. In step S101, it is determined whether the operations are performed first on the accelerator and then on the brake.

If the accelerator operation is performed first (S101: YES), the processing proceeds to step S102. In step S102, it is determined whether the brake pedal depressing force, which is an indicator value of the braking force, exceeds a prescribed determination threshold $\alpha 1$. Next, in step S103, it is determined whether the duration of the simultaneous operations on the accelerator and the brake exceeds a prescribed determination threshold $\beta 1$.

If a negative determination is made in any of steps S102 and S103 (S102: NO, or step S103: NO), the processes of the routine at this time are ended. In contrast, if positive determinations are made both in steps S102 and S103 (S102: YES, and step S103: YES), the processing proceeds to step S104. In step S104, the amount of reduction of the engine output is set large to perform a process of suppressing the engine output, and subsequently the processes of the routine at this time are finished.

In contrast, if the brake operation is performed first (S101: NO), the processing proceeds to step S105. In step S105, it is determined whether the brake pedal depressing force exceeds a prescribed determination threshold $\alpha 2$. The value of the determination threshold $\alpha 2$ used for determination is set higher than that of the determination threshold $\alpha 1$ used for the determination in step S102.

Next, in step S106, it is determined whether the duration of the simultaneous operations on the accelerator and the brake exceeds a prescribed determination threshold $\beta 2$. The value of determination threshold $\beta 2$ used for the determination is also set higher than that of the determination threshold $\beta 1$ used for the determination in step S103.

If a negative determination is made in any of steps S105 and S106 (S105: NO, or step S106: NO), the processes of the routine at this time are ended. In contrast, if positive determinations are made both in steps S105 and S106 (S105: YES, and step S106: YES), the processing proceeds to step S107. In step S107, the process of suppressing the engine output where the amount of reduction of the engine output is set smaller than in the case of step S104 is performed, and subsequently the processes of the routine at this time are finished.

The processes of suppressing the engine output performed in steps S104 and S107 are finished according to satisfaction of a returning condition, such as cancellation of simultaneous operations on the accelerator and the brake, or reduction in vehicle speed.

In this embodiment described above, the amount of reduction of the engine output in the reduction control of the vehicle drive force in response to simultaneous operations on the accelerator and the brake is smaller in the case where the brake operation is performed first resulting in the simultaneous operations on the accelerator and the brake than in the case where the accelerator operation is performed first resulting in the simultaneous operations on the accelerator and the brake. In this embodiment, the conditions of executing the reduction control of the vehicle drive force are more strict in the case where the brake operation is performed first resulting in the simultaneous operations on the accelerator and the brake than in the case where the accelerator operation is performed first resulting in the simultaneous operations on the accelerator and the brake. Accordingly, in the case where the accelerator operation is performed after the brake operation, reduction in vehicle drive force in response to the simultaneous operations on the accelerator and the brake can be suppressed, which allows the vehicle drive force to be operated according to the intention of the driver.

This embodiment described above achieves the following advantages.

(1) In this embodiment, the manner of reduction control of the vehicle drive force in response to the simultaneous operations on the accelerator and the brake varies between the case where the accelerator operation is performed first and then the brake operation is performed and the case where the brake operation is performed first and then the accelerator operation is performed. More specifically, the amount of reduction in vehicle drive force (engine output) in the reduction control is smaller, and the determination threshold of the braking force (brake pedal depressing force) for determining whether the reduction control is required to be executed and the determination threshold of the simultaneous operation duration are set higher, in the case where the brake operation is performed first than in the case where the accelerator operation is performed first. Thus, even if the reduction control of the vehicle drive force is executed in response to simultaneous operations on the accelerator and the brake, the vehicle drive force can be operated according to the intention of the driver to thereby suppress degradation in drivability.

Second Embodiment

A vehicle control device according to a second embodiment of the present invention will now be described in detail with reference to FIGS. 4 and 5. In the present embodiment and each of the following embodiments, like or the same reference numerals are given to those components that are like or the same as the corresponding components of the above described embodiment and detailed explanations are omitted.

In the first embodiment, the amount of reduction in vehicle drive force in the reduction control is smaller, and the determination threshold of the braking force for determining whether the reduction control is required to be executed and the determination threshold of the simultaneous operation duration are higher in the case where the brake operation is performed first than in the case where the accelerator operation is performed first. In the present embodiment, in the case where the brake operation is performed first resulting in simultaneous operations on the accelerator and the brake, the start of reducing the vehicle drive force is delayed. Furthermore, the delay time varies according to the vehicle speed and the amount of accelerator operation.

Figure 4:
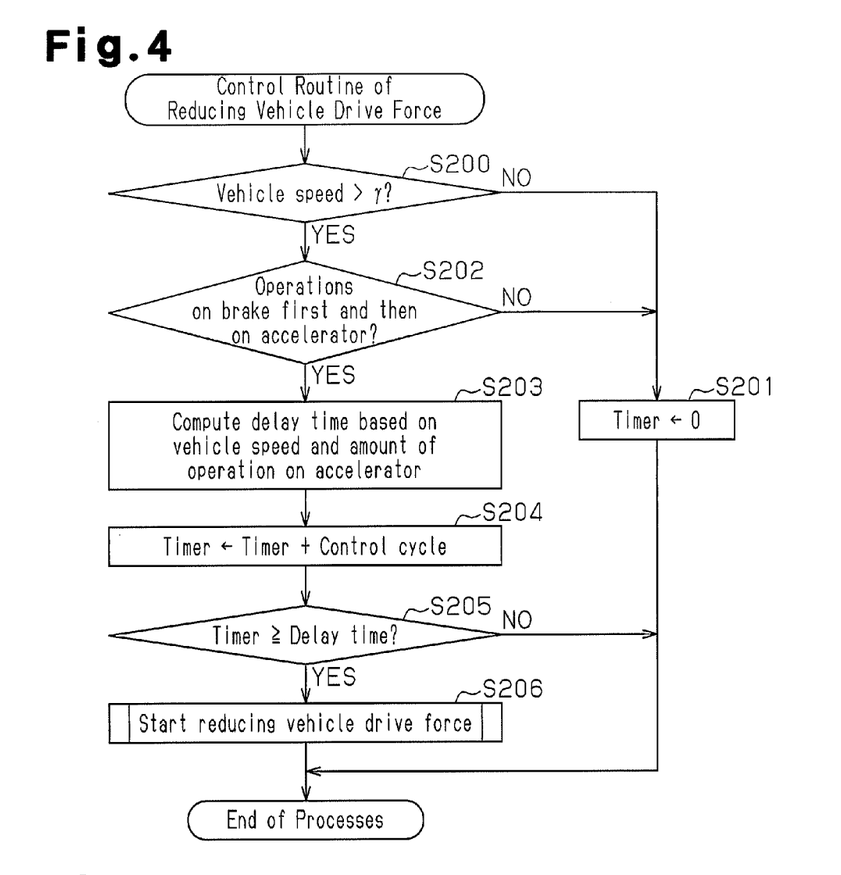
FIG. 4 is a flowchart showing a procedure of a control routine for reducing the vehicle drive force, which is applied to a second embodiment of the present invention.
Figure 5:
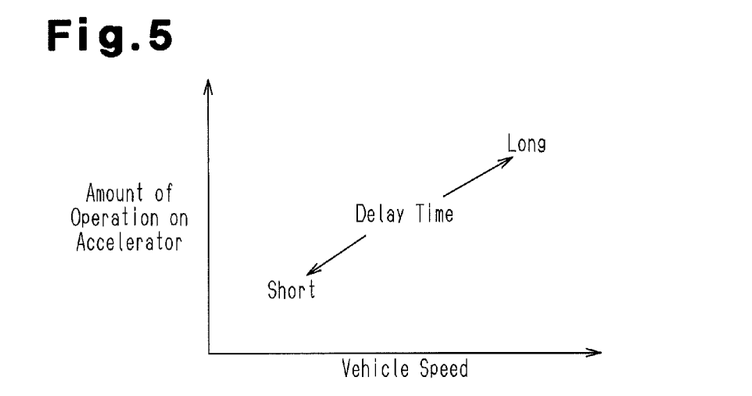
FIG. 5 is a graph showing an example of a manner of setting a delay time in this embodiment.

A control routine for reducing the vehicle drive force shown in FIG. 4 is repeatedly performed by the electronic control unit 1 at prescribed control cycles during simultaneous operations on the accelerator and the brake.

After this routine is started, it is first determined whether the vehicle speed exceeds a prescribed value $\gamma$ in step S200. If the vehicle speed is equal to or less than the prescribed value $\gamma$ (S200: NO), the value of the timer is cleared in step S201 and subsequently the processes of the routine at this time are finished. In this case, the vehicle drive force is immediately reduced.

If the vehicle speed exceeds the prescribed value $\gamma$ (S200: YES), in step S202 it is determined whether the operations are performed first on the brake and then on the accelerator. If the operations are performed first on the accelerator and then on the brake (S201: NO), the value of the timer is cleared in step S201 and subsequently the processes of the routine at this time are finished. Also in this case, the vehicle drive force is immediately reduced.

In contrast, if the operations are performed first on the brake and then on the accelerator (S201: YES), the delay time is computed on the basis of the vehicle speed and the amount of accelerator operation in step S203. The delay time in the case where the brake operation is performed first is computed such that, the higher the vehicle speed is or the larger the amount of accelerator operation is, the longer the delay time is, as shown in FIG. 5.

Subsequently, in step S204, a control cycle, which is an execution interval of this routine, is added to the value of the timer. Next, in step S205, it is determined whether the value of the timer is at least the delay time computed in step S203. If the value of the timer is less than the delay time (S205: NO), the processes of the routine at this time are ended. In contrast, if the value of the timer is at least the delay time (S205: YES), reduction in vehicle drive force is started in step S206.

This embodiment achieves the following advantage.

(2) According to this embodiment, in the case where the vehicle speed is high and the brake operation is performed first, the vehicle drive force is not reduced until the delay time elapses after the operations on the accelerator and the brake. Accordingly, in the case where the accelerator operation is performed after the brake operation, the possibility of reduction in vehicle drive force according to simultaneous operations on the accelerator and the brake decreases, and the vehicle drive force can be operated according to the intention of the driver.

Third Embodiment

A vehicle control device according to a third embodiment of the present invention will now be described in detail with reference to FIG. 6. In this embodiment, in the case where the brake operation is performed first and the vehicle speed is high, reduction in vehicle drive force in response to simultaneous operations on the accelerator and the brake is prohibited.

Figure 6:
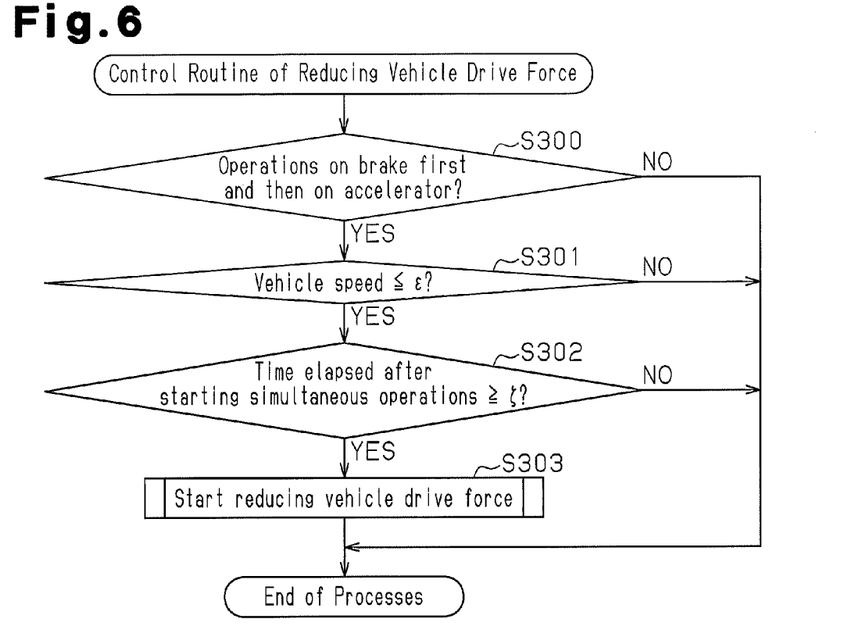
FIG. 6 is a flowchart showing a procedure of a control routine for reducing the vehicle drive force, which is applied to a third embodiment of the present invention.

A control routine for reducing the vehicle drive force shown in FIG. 6 is repeatedly performed by the electronic control unit 1 at prescribed control cycles during simultaneous operations on the accelerator and the brake.

After this routine is started, it is first determined whether operations are performed first on the brake and then on the accelerator in step S300. If the operations are performed first on the accelerator and then on the brake (S300: NO), the processes of the routine at this time are ended. In this case, reduction in vehicle drive force is immediately started.

If the operations are performed first on the brake and then on the accelerator (S300: YES), in step S301 it is determined whether the vehicle speed is equal to or less than a prescribed value $\epsilon$. If the vehicle speed exceeds the prescribed value $\epsilon$ (S301: NO), the processes of the routine at this time are ended, and the vehicle drive force is not reduced.

In contrast, if the vehicle speed is equal to or less than the prescribed value $\epsilon$ (S301: YES), a lapse of the prescribed time $\zeta$ is waited after the start of simultaneous operations (S302: YES) and then reduction in vehicle drive force is started.

According to this embodiment, in the case where the brake is operated first resulting in simultaneous operations on the accelerator and the brake, the vehicle drive force is reduced only if the vehicle speed is low.

The aforementioned embodiment achieves the following advantage.

(3) According to this embodiment, in the case where the brake operation is performed first and the vehicle speed is high, reduction in vehicle drive force in response to simultaneous operations on the accelerator and the brake is prohibited. When the vehicle speed is high, the gear ratio of the transmission is also high and the driving force of the vehicle is low. Accordingly, the braking force is sufficiently higher than the driving force without any reduction in driving force. Therefore, in this case, the driving force is not reduced, and the operation by the driver is reflected as it is. Thus, according to this embodiment, even if the reduction control of the vehicle drive force is performed in response to simultaneous operations on the accelerator and the brake, the vehicle drive force can be operated according to the intention of the driver to thereby suppress degradation in drivability.

Fourth Embodiment

A vehicle control device according to fourth embodiment of the present invention will now be described in detail with reference to FIG. 7. According to this embodiment, in the case where the brake operation is performed first and the vehicle speed is high, reduction in vehicle drive force in response to simultaneous operations on the accelerator and the brake is prohibited.

Figure 7:
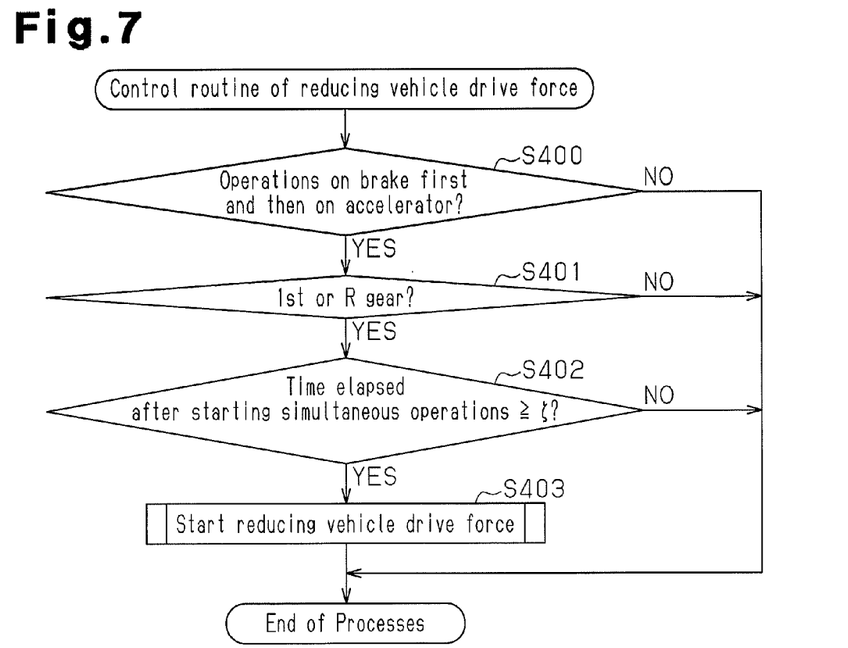
FIG. 7 is a flowchart showing a procedure of a control routine for reducing the vehicle drive force, which is applied to a fourth embodiment of the present invention.

A control routine for reducing the vehicle drive force shown in FIG. 7 is repeatedly performed by the electronic control unit 1 at prescribed control cycles during simultaneous operations on the accelerator and the brake.

After this routine is started, in step S400 it is first determined whether operations are performed first on the brake and then on the accelerator. If the operations are performed first on the accelerator and then on the brake (S400: NO), the processes of the routine at this time are ended. In this case, reduction in vehicle drive force is immediately started.

If operations are performed first on the brake and then on the accelerator (S400: YES), in step S401 it is determined whether the 1st (first) or R (reverse) gear is selected. If the any gear other than 1st or R is selected (S401: NO), the processes of the routine at this time are ended, and the vehicle drive force is not reduced.

In contrast, if the 1st or R gear is selected (S401: YES), a lapse of the prescribed time is waited after the start of simultaneous operations (S402: YES) and then reduction in vehicle drive force is started.

According to this embodiment, in the case where the brake is operated first resulting in simultaneous operations on the accelerator and the brake, the vehicle drive force is reduced only if the gear ratio of the transmission is low.

The aforementioned embodiment achieves the following advantage.

(4) According to this embodiment, in the case where the brake operation is performed first and the gear ratio of the transmission is high, reduction in vehicle drive force in response to simultaneous operations on the accelerator and the brake is prohibited. When the vehicle speed is high, the gear ratio of the transmission is also high and the driving force of the vehicle is low. Accordingly, the braking force is sufficiently higher than the driving force without any reduction in driving force. Therefore, in this case, the driving force is not reduced, and the operation by the driver is reflected as it is. Thus, according to this embodiment, even if the reduction control of the vehicle drive force is performed in response to simultaneous operations on the accelerator and the brake, the vehicle drive force can be operated according to the intention of the driver to thereby suppress degradation in drivability.

The aforementioned embodiments may be modified as follows.

In the second embodiment, the delay time is set in reduction in vehicle drive force only for the case where the brake operation is performed first. However, the delay time may be set also for the case where the accelerator operation is performed first. Also in this case, if the delay time is longer in the case where the brake operation is performed first, degradation in drivability can be suppressed.

In the first embodiment, the braking force determination threshold for determining whether the reduction control is required to be executed varies and the determination threshold of the simultaneous operation duration varies, according to the order of the accelerator operation and the brake operation. Instead, only one of the determination thresholds may vary.

In the first embodiment, the amount of reduction in vehicle drive force in reduction control varies and the executing conditions vary according to the order of the accelerator operation and the brake operation. Instead, only the amount of reduction in vehicle drive force in reduction control may vary, or only the executing conditions in reduction control may vary.

In the first embodiment, it may be determined whether the reduction control of the vehicle drive force is required to be executed on the basis of parameters other than the braking force and the simultaneous operation duration. Also in the situations, if the conditions of executing the reduction control of the vehicle drive force are more strict in the case where the brake operation is performed first resulting in the simultaneous operations on the accelerator and the brake than in the case where the accelerator operation is performed first resulting in the simultaneous operations on the accelerator and the brake, the vehicle drive force can be operated according to the intention of the driver.

In the second embodiment, the delay time is set on the basis of both the vehicle speed and the amount of accelerator operation. Instead, the time may be set on the basis of only one of them. The delay time may be a fixed value.

In the embodiments, the brake pedal depressing force is used as an indicator value of the braking force. Instead, if the operating oil pressure (brake pressure) of a brake device is detected, the brake pressure may be used as an indicator value of the braking force instead of the brake pedal depressing force.

In the embodiments, the engine output is suppressed in accordance with reduction in opening of the throttle valve 8 due to overwriting of the amount of accelerator operation. Instead, the engine output can be suppressed by another engine control, such as reduction in fuel injection rate or ignition timing retard.

In the embodiments, depression of the brake pedal 4 is detected by the stop lamp switch 5. Instead, depression of the brake pedal 4 may be detected by another switch or sensor. For instance, a brake operation may be detected on the basis of a detection result of a brake pressure sensor for detecting the operating oil pressure of the brake device.

In the embodiments, the accelerator operation and the brake operation are performed by depressing the accelerator pedal 2 and the brake pedal 4, respectively. Instead, the accelerator operation and the brake operation may be performed by operations other than depression of the pedals. The operations other than depression of the pedals may include, for instance, an operation with a hand, such as on a paddle for shifting, or a voice-activated operation.

In the embodiments, the case has been described where the control device of the present invention is applied to the vehicle adopting the engine 6 as the drive source. Instead, the present invention is also applicable to an electric vehicle that adopts a motor as a drive source and a hybrid vehicle that adopts a motor and an engine as drive sources.

DESCRIPTION OF THE REFERENCE NUMERALS

1 . . . electronic control unit (1a . . . central processing unit (CPU), 1b . . . read-only memory (ROM), 1c . . . random access memory (RAM)), 2 . . . accelerator pedal, 3 . . .

accelerator pedal sensor, 4 . . . brake pedal, 5 . . . stop lamp switch, 6 . . . engine, 7 . . . air intake path, 8 . . . throttle valve, 9 . . . throttle motor, 10 . . . brake pedal depressing force sensor.

The invention claimed is:

1. A vehicle control device comprising a processor that performs reduction control for reducing a vehicle drive force when an accelerator operation and a brake operation are simultaneously performed,
   wherein the processor is configured to vary a delay time until the reduction control is started between a case where the accelerator operation is performed first and then the brake operation is performed and a case where the brake operation is performed first and then the accelerator operation is performed, and
   wherein the processor is configured to vary a length of the delay time according to a vehicle speed or an amount of accelerator operation.

2. The vehicle control device according to claim 1, wherein the processor is configured to vary an amount of reduction in the vehicle drive force of the reduction control between the case where the accelerator operation is performed first and then the brake operation is performed and the case where the brake operation is performed first and then the accelerator operation is performed.

3. The vehicle control device according to claim 1, wherein the processor is configured to vary a condition of executing the reduction control between the case where the accelerator operation is performed first and then the brake operation is performed and the case where the brake operation is performed first and then the accelerator operation is performed.

4. The vehicle control device according to claim 3, wherein the processor is configured to vary a determination threshold of a braking force for determining whether the reduction control is required to be executed between the case where the accelerator operation is performed first and the case where the brake operation is performed first.

5. The vehicle control device according to claim 4, wherein the processor is configured to set the determination threshold of the braking force to be higher in the case where the brake operation is performed first than in the case where the accelerator operation is performed first.

6. The vehicle control device according to claim 3, wherein the processor is configured to vary a determination threshold of the simultaneous operation duration for determining whether the reduction control is required to be executed between the case where the accelerator operation is performed first and the case where the brake operation is performed first.

7. The vehicle control device according to claim 6, wherein the processor is configured to set the determination threshold of the duration to be higher in the case where the brake operation is performed first than in the case where the accelerator operation is performed first.

8. The vehicle control device according to claim 1, wherein the processor is configured to vary the delay time to be longer in the case where the brake operation is performed first than in the case where the accelerator operation is performed first.

9. The vehicle control device according to claim 1, wherein the processor is configured to extend the length of the delay time in the case where the brake operation is performed first as the amount of accelerator operation increases.

10. The vehicle control device according to claim 1, wherein the processor is configured to set the delay time only in a case where the brake operation is performed first and a vehicle speed exceeds a prescribed value.

11. The vehicle control device according to claim 1, wherein the processor is configured to prohibit reduction in the vehicle drive force in a case where the brake operation is performed first and a vehicle speed exceeds a prescribed value.

12. The vehicle control device according to claim 1, wherein the processor is configured to prohibit reduction in the vehicle drive force in a case where the brake operation is performed first and a gear position of a transmission is other than a first fear position and a reverse gear position.

13. The vehicle control device according to claim 2, wherein the processor is configured to set the amount of reduction of the vehicle drive force to be smaller in the case where the brake operation is performed first than in the case where the accelerator operation is performed first.

14. A vehicle control device comprising a processor that performs reduction control for reducing a vehicle drive force when an accelerator operation and a brake operation are simultaneously performed,
   wherein the processor is configured to vary a delay time until the reduction control is started between the case where the accelerator operation is performed first and then the brake operation is performed and the case where the brake operation is performed first and then the accelerator operation is performed, and
   wherein the processor is configured to extend a length of the delay time as the vehicle speed increases.

* * * * *